United States Patent
Pan (10) Patent No.: US 9,317,436 B2
(45) Date of Patent: Apr. 19, 2016

(54) CACHE NODE PROCESSING (71) Applicant: Hewlett-Packard Development Company, L P., Houston, TX (US)

(72) Inventor: Weimin Pan, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 188 days.

(21) Appl. No.: 13/923,370

(22) Filed: Jun. 21, 2013

(65) Prior Publication Data

US 2014/0379990 A1 Dec. 25, 2014

(51) Int. Cl.
G06F 12/08 (2006.01)

(52) U.S. Cl.
CPC ........ *G06F 12/0871* (2013.01); *G06F 12/0804* (2013.01); *G06F 12/0868* (2013.01)

(58) Field of Classification Search
None
See application file for complete search history.

(56) References Cited

U.S. PATENT DOCUMENTS

| | | | |
|---|---|---|---|
| 6,629,211 B2 | 9/2003 | McKnight et al. | |
| 7,035,974 B2 | 4/2006 | Shang | |
| 7,272,687 B2 | 9/2007 | Balasubramanian | |
| 7,340,555 B2 | 3/2008 | Ashmore et al. | |
| 7,711,897 B1 * | 5/2010 | Chatterjee et al. | 711/114 |
| 2002/0108017 A1 * | 8/2002 | Kenchammana-Hoskote et al. | 711/113 |
| 2003/0037204 A1 * | 2/2003 | Ash et al. | 711/113 |
| 2008/0040553 A1 * | 2/2008 | Ash et al. | 711/133 |
| 2010/0199042 A1 | 8/2010 | Bates et al. | |
| 2012/0131265 A1 * | 5/2012 | Koltsidas et al. | 711/103 |
| 2013/0326149 A1 * | 12/2013 | Barrell et al. | 711/135 |

OTHER PUBLICATIONS

Lynn, B. et al., Non-volatile Cache for Host-based RAID Controllers, (Research Paper), Jan. 2011, 14 pps., http://www.dell.com/downloads/global/products/pvaul/en/NV-Cache-for-Host-Based-RAID-Controllers.pdf.

Yao, X. et al., RIMAC—a Novel Redundancy-based Hierarchical Cache Architecture for Energy Efficient, High Performance Storage Systems, (Research Paper), Mar. 8, 2006, 14 pps., http://www.eecs.ucf.edu/~jwang/papers/rimac.pdf.

* cited by examiner

*Primary Examiner* — Mardochee Chery
*Assistant Examiner* — William E Baughman
(74) *Attorney, Agent, or Firm* — Hewlett Packard Enterprise Patent Department (57) ABSTRACT

A technique for cache node processing that includes generating a cache node in response to a request to write data to storage devices. If logical block address (LBA) of the generated cache node is adjacent to LBA of cache nodes of a cache node list, then check if there are cache nodes that are sequential up to a predefined boundary. If there are cache nodes that are sequential up to the predefined boundary, then flush the data of the sequential cache nodes together as a group up to the predefined boundary.

18 Claims, 6 Drawing Sheets

CACHE NODE PROCESSING

BACKGROUND

Storage device controllers, such as redundant array of independent disk (RAID) controllers, may be associated with a cache. A host seeking to write data to or read data from a storage device, may access the cache instead of the storage device, in order to reduce latency and increase performance.

BRIEF DESCRIPTION OF THE DRAWINGS

Examples are described in the following detailed description and in reference to the drawings, in which.

DETAILED DESCRIPTION

A storage system may include storage device controllers, such as redundant array of independent disk (RAID) controllers, which may be associated with a cache. A host seeking to write data to or read data from a storage device, may access the cache instead of the storage device, in order to reduce latency and increase performance. The storage devices, such as hard disk drives, may be configured as storage volumes which may allow the host to interface with storage using a logical address and without having to have knowledge of the physical layout or structure of the storage devices. The storage controller may include a read cache which may hold data from the storage volume and then allow the controller to return back the data to the host from the cache which may reduce read latency. In another example, the storage controller may include a write cache, such as a post write back cache, which may be configured to allow the storage controller to write data from the host to the write cache and then return back to the host without having to wait for the data to be written to the storage volume which may reduce latency and improve write performance.

In some examples of the present application, a storage controller may be configured to write or store data in a cache and then later flush or write the data from the cache to the appropriate locations of the storage devices. The storage controller may receive requests from hosts to write data to the storage devices. The storage controller may first store the data in the cache until a later time when the storage controller may flush or write the data from the cache to the appropriate storage devices. The data that is held in the cache may be referred to as "dirty data" because it is not immediately written to storage but rather held in the cache to be written to storage devices at a later time. The performance of the system or storage controller may be affected by the process or manner in which the storage controller flushes the dirty data from the cache to the storage devices.

The storage controller may be configured to perform a flush process to write the data from the cache to the storage devices in a manner which may improve performance. For example, in an implementation in which the storage devices are hard disk drives, the flush process may help reduce or minimize the total number of disk drive access operations and minimize spindle seeking distance between two disk access operations. For example, the flush process may minimize the total number of disk access operations by coalescing or grouping together all sequential (consecutively addressed) or continuous cache writes and flushing the cache data together up to a predefined boundary such as a stripe boundary as part of a RAID configuration. For example, the storage controller may configure storage devices to have parity storage volumes, such as in RAID-5 and RAID-6 storage configurations, and then group together or coalesce all sequential (consecutively addressed) or continuous cache writes up to a predefined boundary such as a stripe boundary which may help reduce disk access operations and thereby improve performance.

The storage controller may be configured to operate in a mix workload environment that includes handling requests from hosts to write sequential data and non-sequential data. In one example, sequential data may refer to data that has sequential (consecutively addressed) or continuous addresses with respect to other data and that is adjacent to other data with no address gaps between the data whereas non-sequential data may have address gaps (non-consecutively addressed) between data. The storage controller may generate cache nodes to hold the sequential and non-sequential data from the host before the storage controller writes the data to the appropriate storage devices. The storage controller may include cache memory and configure it as cache nodes which may include a plurality of cache memory locations that may hold data to be written to storage devices at a later time. A sequential or continuous cache node may have an address that is adjacent (consecutively addressed) to the address of another cache node. On the other hand, a non-sequential cache node may have an address that may not be adjacent to the address of another cache node (non-consecutively addressed) but rather may have address gaps between other cache nodes. The storage controller may configure the cache nodes as part of a cache node list which it may sort according to logical address order such as logical block address (LBA) order.

In one example of the techniques of the present application, the storage controller may include a flush process that may process sequential cache nodes and non-sequential cache nodes. For example, the flush process may assign a time period, such as a time-to-live timer or time period, to the cache nodes which may be monitored in a periodic manner to determine whether the time period of the cache nodes has expired. The time-to-live time period or timer may represent an amount of time that a cache node is to remain in a cache node list before it is evicted or flushed to storage. The flush process may flush the data of a cache node that has an age that is relatively old such as when the time-to-live tinier of the cache node expires. In some case, when the storage controller checks a sequential cache node from the cache node list, it may decide to reset the time-to-live timer to provide the cache node with more time to live in the cache node list. In this manner, this may allow the storage controller to generate further cache nodes which may be grouped as sequential cache nodes as part of a full stripe write operation. When the storage controller receives a write request from a host, it generates a new cache node to store or hold the newly received data and then inserts the new cache node into the cache node list according to the address of the cache node. The storage controller may check the address of the cache node, such as the LBA of the cache node, to determine whether the cache node is adjacent (consecutively addressed) to any existing cache nodes in the cache node list. If the storage controller determines that the new cache node is adjacent to another cache node, then the storage controller may reset an access time value of the cache node to the current access time of all the adjacent sequential (continuous) cache nodes, including this new cache node, up to a stripe boundary or a full stripe before it inserts or places this new cache node into cache node list. In another example, the storage controller may calculate the age of the cache node by determining the difference between the current time value which is the current time that the cache node is being accessed and the access time value of the cache node which contains the last time that the cache node was accessed. The storage controller then checks whether the cache node is old enough by determining whether the calculated age value of the cache node is greater than the time-to-live timer of the cache node.

The flush process may include functionality to determine whether to flush the data of a cache node or to retain the cache node in the cache node list. For example, the storage controller may execute a flush process in a periodic manner to select cache nodes from the cache node list one after another in LBA order from the cache node list. The storage controller may then calculate an age value of the cache node. The age value may be based on the difference between the current time value which is the current time that the cache node is being accessed and the access time value of the cache node which is the last time the cache node was accessed. Then the storage controller may check if the age value of the cache node is old enough such as whether the age value is larger than a time-to-live time value (expired condition). If it is, then the storage controller may decide to write or flush the data of the cache node to the location of the appropriate storage device. Otherwise, the storage controller may retain or leave the cache node in the cache node list to be checked at a later time. The storage controller may reset the access time value on all of the sequential (continuous) cache nodes up to a particular number of cache nodes of a boundary such as a stripe boundary of a RAID storage configuration. In such a case, all of these cache nodes may be provided with more time to live in the cache node list to allow for possible subsequent sequential write requests from a host. When all of these sequential or continuous cache nodes reach a particular number of cache nodes, such as a full stripe size, then new host sequential write requests may not affect the cache nodes of the cache node list since the new write request may be part of a different stripe. In this manner, the age value of these cache nodes exceed the time-to-live time (expire) eventually and then be flushed as part of a full stripe operation.

In one example of the present application, disclosed are techniques that provide a cache management process to handle a mix workload of sequential cache nodes and non-sequential cache nodes. The cache management process may include a host command process to handle host commands to request to write data to storage and a cache flush process to determine whether it is time to flush the data of the cache nodes to storage.

In one example, the host command process may include having the storage controller receive requests from a host to write data to storage, and in response, generate new cache nodes to hold the data from the host before it is to be written to the appropriate storage device. The storage controller may then determine an insert point in a cache node list and then insert the cache node into cache node list at the insert point. In another example, the storage controller may sort the cache node list in address order such as LBA (consecutively addressed) order because such an order may correspond to the physical address order of the locations in storage devices. The storage controller may compare the LBA of the new generated cache to the LBA of adjacent cache nodes such as previous adjacent cache nodes and next adjacent cache nodes at the insert point of the cache node list. If the cache nodes are sequential or continuous (consecutively addressed), the storage controller may continue to search all sequential or continuous cache nodes up to a predefined boundary such as a stripe boundary. The storage controller may then reset the access time values to the current time of all these sequential cache nodes including the new cache node. The storage controller may then insert this new cache node into the sorted cache node list.

As explained above, the cache management process may include a cache flush process to determine when to flush the data of the cache nodes to the appropriate locations in the storage devices. In one example, the cache flush process may include having the storage controller select cache nodes from cache node list one cache node after another in LBA order. The storage controller may then calculate the age value of the selected cache node which is based on the difference between the current time value which is the time when the cache node is currently being accessed and the access time value of the cache node which has a value of the last time the cache node was accessed. The storage controller may check if the age value of the cache node is older than a time-to-live value for this cache node (age value exceeds time-to-live value). If it is, then the storage controller may flush the data of the cache node which includes writing the data from the cache node to the appropriate storage. Otherwise, the storage controller may leave or retain the cache node in the cache node list without writing the data to storage. The storage controller may continue or repeat the process by selecting the next cache node from the cache node list until all cache nodes in the list have been checked once. Since the storage controller may reset the access time values on all sequential cache nodes up to a stripe boundary, all these cache nodes now have more time to live in the cache node list. These cache nodes may receive more time to live in the cache node list when the storage controller receives a new sequential write request. When all these sequential cache nodes reach a predefined number, such as a full stripe size, new host sequential write requests may no longer affect these cache nodes anymore since they are associated with a different stripe. These cache nodes may expire eventually and be flushed as part of a full stripe write operation.

In one example of the present application, disclosed is a storage controller for cache node processing that includes a cache node list and a cache management module. The cache management module may be configured to generate a cache node in response to a request to write data to storage devices. If the LBA of the generated cache node is adjacent to LBA of cache nodes of the cache node list, and if there are cache nodes that are sequential up to a predefined boundary, then the storage controller may flush the data of the sequential cache nodes together as a group up to the predefined boundary. In some examples, the cache management module may be further configured to determine an insert point to insert the generated cache node into the cache node list and then insert the generated cache node into the cache node list at the insert point. In another example, the cache management module may be further configured to configure the cache nodes of the cache node list to include pointers to memory configured as write cache to hold the data which is to be written to storage devices.

In some other examples, the cache management module may be further configured to sort the cache nodes of the cache node list in accordance with LBA order. The predefined boundary may include a full stripe of storage configured as redundant array of independent disk (RAID). In some examples, if an age of a cache node of the cache node list is greater than a time-to-live of the cache node, then the storage controller may flush the data of the cache node to storage devices. In some examples, if the LBA of the generated cache node and LBA of previous adjacent cache nodes are sequential, then the storage controller may reset access time of the generated cache node and all of the previous adjacent cache nodes up to a predefined boundary and indicate that the generated cache node and all of the previous adjacent cache nodes are sequential cache nodes. On the other hand, if the LBA of the generated cache node and LBA of next adjacent cache nodes are sequential, then the storage controller may reset the access time of the generated cache node and all of the next adjacent cache nodes up to a predefined boundary and indicate that the generated cache node and the next adjacent cache nodes are sequential cache nodes.

In this manner, the techniques of the present application may help improve performance for a mixed workload environment. For example, these techniques may group together or coalesce sequential operations to a full stripe size which may help reduce disk access (read modify write) operations during parity data generation in a parity storage configuration, as explained below in further detail.

Figure 1:
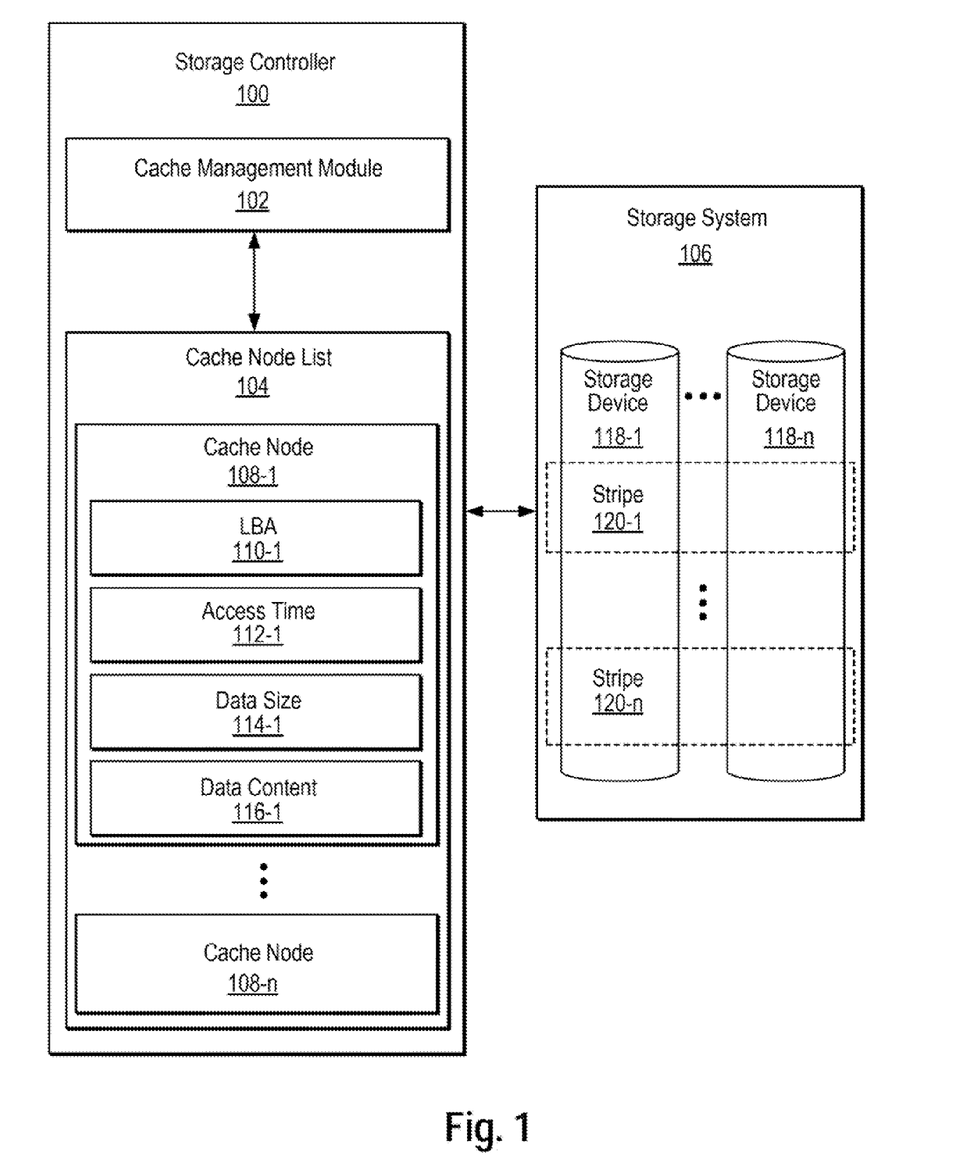
FIG. 1 depicts an example block diagram of a storage controller for cache node processing in accordance with an example of the techniques of the present application.

FIG. 1 depicts an example storage controller 100 for cache node processing in accordance with an example of the techniques of the present application. The storage controller 100 may couple to or be included in any type of computing device that interfaces with a memory, such as a secure microprocessor, a notebook computer, a desktop computer, an all-in-one system, a server, a network device, a wireless device and the like. In the embodiment of FIG. 1, storage controller 100 connects to a storage system 106.

The storage controller 100 may include, for example, a hardware device including electronic circuitry for implementing the functionality described herein, such as control logic and/or memory. In addition or as an alternative, the storage controller 100 may be implemented as a series of instructions encoded on a machine-readable storage medium and executable by a processor. For example, storage controller 100 may independently run an application and/or operating system (OS) for interfacing to storage system 106. The storage controller 100 may connect to a host to receive requests for access to storage system 106. The requests may include requests to write data to storage system 106 and requests to read data from the storage system. The host may refer to any type of device that seeks to access the storage system 106, such as a main processor of a computer or a computer connected to a computer network.

The storage system 106 may include a plurality of storage devices 118 (118-1 through 118-n, where n is a natural number) which may be any electronic, magnetic, optical, or other physical storage device that contains or stores data and/or executable instructions, such as a hard disk drive (HDD), solid-state drive (SSD) and the like. In one example, storage controller 100 may configure storage devices 118 through a virtualization process to virtualize the storage devices 118 to have storage volumes. In this manner, a host may access data on storage system 106 through storage volumes that span multiple storage devices 118 without having to have knowledge of the physical structure of the storage devices. In one example, storage controller 100 may communicate with storage system 106 via a Serial Attached SCSI (SAS) connection and may communicate with host via a Peripheral Component Interconnect (PCI) connection.

The storage controller 100 may exchange commands and data with hosts. For example, the storage controller may receive a plurality of requests from hosts which may include read and/or write accesses to sequential and/or random addresses of locations on storage devices 118. The storage devices 118 may include a plurality of storage drives which may refer to storage mechanisms with fixed or removable media, such as separate HDDs and the like. The storage devices 118 may further be based on a number of drives of the storage devices storage controller 100 is to access per request. For example, the plurality of storage drives of the storage devices 118 may define a structure referred to as a redundant array of independent disks (RAID). In this case, the storage device type may identify a level of a RAID volume. In one example, the term volume may refer to a single accessible storage area with a single file system. While a volume may occupy an area different from a physical disk drive, it may be still accessed with an operating system's logical interface. For example, a RAID-0 volume may include block-level striping without parity or mirroring and no redundancy. A RAID-1 volume may include mirroring without parity or striping. In this case, data may be written identically to two storage drives thereby producing a mirrored set of data. A request from a host related to read access may be serviced by either of the two storage drives containing the requested data. Further, a request from the host related to write access updates the strips of both drives. A RAID-10 volume may include mirroring and striping, where data is written in stripes across the primary drives and then mirrored to the secondary drives. For example, a RAID-10 configuration may consist of two primary drives and two secondary drives.

The storage system 106 includes storage devices 118 that may be configured as storage volumes. The storage volumes nay be formed based on a virtualization process that includes mapping logical block address (LBA) to physical address of locations on physical storage devices such as hard disk drives. The host may access the storage system 106 using logical address without having to need to manage or Know the physical address layout of the storage devices 118. This mapping may depend on the RAID level implemented in storage system 106. The storage devices 118 are configured to have stripes 120 (120-1 through 120-n, where n is a natural number) which represent a number of blocks in storage volumes that are distributed across the storage devices. For example, the system may configure storage system 106 to process data in 512 byte block size portions which may be stripped across multiple storage devices such as disk drives.

The storage controller 100 is configured to manage the operation of storage system 106 through the use of a cache management module 102 and cache node list 104. The cache node list 104 includes a plurality of cache nodes such as cache nodes 108 (108-1 through 108-n, where n is a natural number). The cache management module 102 may interact with cache node list 104 to write to cache node data that it receives from the host, and at a later time, then write the data of the cache nodes to the appropriate storage devices 118. The cache nodes 108 include cache information or metadata related to the cache nodes such as respective LBA 110 (110-1 through 110-n, where n is a natural number), access time 112 (112-1 through 112-n, where n is a natural number), data size 114

(114-1 through 114-n, where n is a natural number) and data content 116 (116-1 through 116-n, where n is a natural number). The LBA 110 information represents the logical address of the data that is to be written to the storage devices 118. The logical address information such as LBA 110 of the data is received from the host along with data content 116. The access time 112 represents the time value that the particular cache node 108 was last accessed by cache management module 102. The data size 114 represents the amount or size of the data received from the host and then stored or held in the cache memory associated with the particular cache node 108. The data content 116 represents the actual data content received from the host and then held or stored in the cache memory associated with the particular cache node 108. The cache nodes 108 may also be assigned a time-to-live timer value which represents the amount of time cache node 108 is to remain in cache node list 104 until it is flushed to storage.

The cache node list 104 may be configured as a data structure such as a linked list data structure of cache nodes 108. The cache nodes 108 may include pointers to memory locations in cache memory allocated for cache purposes. The cache memory may be any type of electronic memory device to store data which is to be subsequently written to storage devices 118. In one example, the cache memory may be a write cache such as a post write back cache which is configured to allow cache management module 102 to write data to the cache and not have the cache management module wait for the data from the cache to be written to the storage devices. That is, a host may send a request to storage controller 100 to write data to storage devices 118. In response, cache management module 102 may write the data to the write cache and then respond with a successful acknowledgement to the host once the cache management module writes the data to the write cache. The cache management module 102 may keep track of the amount of "dirty data" in the write cache which is data that has been written to the write cache but not written to storage devices 118. The storage controller 100 may include a background task which may be configured to periodically execute a flush process to flush or write the dirty data from the write cache to the appropriate storage devices or storage volumes. In one example, the background task may be able to flush some but not all of the data from the write cache to the storage volumes, therefore there still may be data in the write cache that may take some time or several cycles to be written to storage volumes. The amount of data that remains in the write cache as dirty data may depend on the input rate at which data is written to the write cache and the output rate at which data is written from the write cache to the storage volume. For example, if the input rate is higher than the output rate, then there will be larger amount of data on the write cache. On the other hand, if the input rate is lower than the output rate, then there will be a lower amount of data on the write cache.

In another example, cache memory may be configured as a write cache that may be arranged as a write through cache in which data is written to the cache but the storage controller needs to wait for the data to be written from the cache to the storage device before it may respond to the host that the data has been written. In another example, cache memory may include a plurality of read cache which may be used by storage controller to read data from the read cache and return the data to a host. In general, cache memory may allow storage controller 100 to lower write latency and improve write performance. For example, data writes to the cache memory may have a lower latency than that of the storage device 118. For instance, cache memory may include double data rate (DDR) RAM while the storage device 118 may include a hard disk drive (HDD).

The cache management module 102 may be configured to process host requests to write data to cache nodes 108 and then flush or write the data of the cache nodes to the appropriate locations of storage devices 118. In one example, cache management module 102 may receive requests from a host to write data to storage devices 118. In response, cache management module 102 may generate an appropriate number of cache nodes 108 to store the host data. In one example, cache nodes 108 may include pointers that reference cache memory which point to locations in the cache memory where the host data is stored before the data is written to the appropriate locations in storage devices 118. The size of the cache memory associated with the cache nodes 108 may be a fixed size such as 16 kilobytes (KB). In one example, the size of the cache memory associated with the cache nodes 108 may be based on host request data size. In some examples, the cache memory may be associated with a single cache node or multiple cache nodes to hold the host data. In other words, when host requests are received by cache management module 102, the cache management module may respond by generating cache nodes and then writing the host data to the cache memory that is referenced by the pointer to the cache memory. In some examples, the cache memory may be configured as write cache to hold the data which is to be written to storage devices at a later time. The cache management module 102 may generate cache node list 104 which may be a linked list of cache nodes 108 and sort the cache node list according to or based on LBA order. As explained above, cache management module 102 may generate new cache nodes in response to requests from hosts to write data to storage devices 118. The cache nodes 108 may include LBA 110 which provides a logical address of data and can be translated to indicate the physical address of the location in storage devices where the data is to be written. The cache management module 102 may determine an insert point to insert the new generated cache node into cache node list 104 and then insert the generated cache node into the cache node list at the insert point.

The cache management module 102 may be configured to flush or write the data associated with the cache nodes 108 to the appropriate storage locations of storage devices 118. In one example, cache management module 102 may provide a flush process that is executed as background task and that may execute in a periodic manner. The flush process may write the data from the cache nodes to the appropriate storage locations of storage devices. In this manner, this process may help release or free up cache memory which may allow the host to send additional data to be placed in the cache memory. In some examples, storage devices 118 may be implemented as hard disk drives which may comprise disk platters and concentric tracks and sectors and includes a magnetic read/write head which is moved across the tracks to write the data of the cache nodes to particular locations on the tracks. The flush process may cause the head to move to write data on the tracks of the disk drives in a more efficient manner. This flush process may provide better performance and exhibit less latency or amount of time spent on disk seek operations when the head moves to the location on the tracks to write data to the disk drive, as explained below.

The cache management module 102 may be configured to handle sequential and non-sequential cache nodes. For example, in a disk drive implementation, it may be more efficient to write data from sequential cache nodes than to write data from non-sequential cache nodes to the disk drive because there may be less head movement in sequential data writes than in non-sequential data writes. For instance, assume that cache node list 104 includes a first cache node 108-1 associated with a first LBA 110-1, a seventh cache node 108-7 associated with a seventh LBA 110-7 and an eighth cache node 108-8 associated with an eighth LBA 110-8, wherein LBA-7 and LBA-8 are consecutively addressed. In this case, cache management module 102 may cause the disk drive head to move to tracks(s) corresponding to the physical track location associated with first LBA 110-1 in order to write the data of first cache node 108-1 to the corresponding disk drive location associated with first LBA 110-1. However, then cache management module 102 may decide to write the data of seventh cache node 108-7 and eighth cache node 108-8, these write operations may require the disk drive head to move to the tracks(s) corresponding to drive location associated with LBA 110-7 and then to the tracks corresponding to the disk drive location associated with LBA 110-8. In this case, cache node 108-7 has LBA 110-7 that is adjacent and sequential to LBA 110-8 of cache node 108-8, because the cache nodes sequential (consecutively addressed), there may be less head movement which may reduce latency and improve performance. In other words, it may be more efficient to write data that is in sequential address order such as seventh LBA 110-7 and then eighth LBA 110-8 instead of to write data that is in non-sequential address order such as first LBA 110-1 and then LBA 110-7 and LBA 110-8.

In another example, to further illustrate functionality of cache management module 102, assume that storage system 106 is configured with three storage devices 118-1, 118-2, 118-3 and that there are storage volumes that span or extend across these storage devices. Furthermore, assume that these storage devices 118 are configured as RAID-0 configuration which may include striping data across the storage devices which may improve performance or configured as RAID-5 configuration which may also include striping data across multiple storage devices but also provide parity volumes for fault tolerance. These configurations include stripes such as stripes 120 that extend across the multiple storage devices 118. The stripes 120 may further comprise strips which are locations in storage devices 118 that may store data blocks. For example, storage system 106 may be configured with three storage devices 118-1, 118-2, 118-3 as RAID-0 configuration in which each of the storage devices has a strip size, such as 128 KB, which results in a stripe 120 that spans across the storage devices for a total size of 3 times 128 KB. Further, cache nodes 108 include LBA 110 which may provide address information or mapping information indicating which stripe 120 and strips corresponds to the logical address associated with data of the cache nodes. For example, cache node list 104 may include a first cache node 108-1 with a first LBA 110-1, a second cache node 108-2 with a second LBA 110-2 and a third cache node 108-3 with a third LBA 110-3 (all of which are consecutively addressed) which indicates respective data of cache nodes to be written to strips of respective storage drives 118-1, 118-2, 118-3, all of which are part of a stripe 120 that extends across these storage devices.

The cache management module 102 may be configured to write or flush data from cache nodes 108 to storage devices 118 based on blocks. For example, blocks may be defined as a plurality of consecutively addressed bytes of data. The cache management module 102 may configure storage devices 118 to have a block size of 512 bytes which means that the LBA block size will also be 512 bytes. In this case, assuming a strip size of 128 KB, then each strip may hold or store 256 blocks (256 blocks=128 KB 1512 bytes) of data with each block holding 512 bytes. Furthermore, in this case, first LBA 110-1 may be associated with the first block of data (512 bytes), second LBA 110-2 may be associated with the second block of data (512 bytes) and so on. As explained above, a host may send the data to be written to storage and send logical address information, in this case LBA 110, along with the data which may represents the logical address of the data which may be translated to the physical address location to store the data on the storage devices. The cache management module 102 may include logical address to physical address mapping functionality that may translate the logical address information (LBA) into the corresponding physical address on the storage devices. In other words, cache management module 102 may determine the physical address locations on the disk drive corresponding to the LBA address information when it writes the data from the cache nodes to the storage devices.

The cache management module 102 may configure cache nodes 108 of cache node list 104 to allow data from the cache nodes to be written to physical locations of storage devices corresponding to the logical address or LBA of the cache nodes. In one example, the normal sequence (consecutively addressed) or order of LBA begins with a small address and extends to a larger address which corresponds to the physical address or locations of the storage devices. In this case, cache management module 102 may sort cache node list 104 in LBA order because the LBA order corresponds to the physical address of the storage devices and thereby may improve performance compared to an unsorted cache node list. As explained above, cache management module 102 may include storage device address mapping functionality to provide sequential or consecutive address translations such as a sequential logical address information translation to corresponding sequential physical locations on the storage devices. For example, cache management module 102 may translate the sequential order of LBA 110 into the sequential or consecutive order of physical storage device locations.

The cache management module 102 may include a flush process to determine the manner in which to flush data from cache nodes 108 to corresponding physical locations of storage devices 118. The cache node list 104 may include cache nodes 108 that may be sorted according to LBA 110. The cache management module 102 may execute a flush process that may traverse the cache node list in LBA order to determine which cache nodes are to be flushed to storage devices. In one example, cache management module 102 may determine the age of the cache node and decide whether to retain the cache node in the cache node list or flush or evict the data of the cache node based on the age information. For example, cache management module 102 may decide to retain cache nodes in cache node list that have age values that are relatively new or more recent and flush or evict cache nodes that have age values that are relatively older. These techniques may improve performance because relatively older data may be flushed in a faster manner and flushed first before relatively newer data is flushed to storage devices. In this manner, cache nodes with more recent data may be retained in the cache node list while cache nodes with less recent data may be flushed sooner to storage devices, in some examples, cache management module 102 may select cache nodes 108 in LBA order from the sorted cache node list 104 and select cache nodes to flush based on the age of the cache nodes. In some examples, cache management module 102 may check access time 112 of cache nodes 108 to determine whether the cache node has expired. In one example, expiration of a cache node may be defined as when the age of the cache node is greater than a threshold value such as a predefined time, such as a time-to-live value, assigned to the cache node. In other words, cache nodes may be flushed in LBA order and flushed based on the age of the cache nodes such that newer cache nodes are retained while older cache nodes are flushed.

The cache management module 102 may be configured to handle sequential cache nodes and non-sequential cache nodes. For example, sequential cache nodes may be defined as cache nodes having sequential (consecutively addressed) or continuous addresses or are adjacent to other cache nodes. On the other hand, non-sequential cache nodes may be defined as cache nodes having non-sequential (non-consecutively addressed) or non-continuous addresses or have address gaps or that are not adjacent to other cache nodes. The cache management module 102 may receive both sequential and non-sequential write requests from a host. As explained above, a stripe 120 may be defined as a sequence of data blocks that are written across or that extend across storage devices 118.

The cache management module 102 may be configured to handle full stripe write operations and partial stripe write operations. A full stripe write operation may be defined as when data is written from cache nodes 108 to a stripe 120 across the whole of the stripe including from the start of the stripe boundary to the end of the stripe boundary. On the other hand, a partial stripe write operation may be defined as when data is written from cache nodes 108 to a stripe 120 but not across the whole of the stripe. The cache management module 102 may be configured to handle full stripe write operations and partial stripe write operations. A full stripe write operation may provide better performance compared to a partial write operation, as explained below. For example, assume that storage system 106 is configured with a first storage device 118-1 and a second storage device 118-2 to store data and a third storage device 118-3 to store parity data as a part of a RAID-5 storage configuration. As explained above, a RAID-5 storage configuration may include data that is striped across multiple storage devices and with parity volumes for fault tolerance.

To illustrate partial stripe operation, for example, assume that storage devices 118 have a first stripe 120-1 with a size of 256 KB and that cache node list 104 has several cache nodes 108 with a total size of 128 KB with LBA addresses that correspond to the first stripe 120-1. In this case, the size of first stripe 120-1 is 256 KB which is more than the size of the data of the cache nodes 108 with a total size of 128 KB. The cache management module 102 may execute a flush process and decide to write or flush the data from cache nodes 108 to stripe 120-1 of storage devices 118. The cache management module 102 may proceed with the flush process by first performing a read operation to read the old or existing data from first storage device 118-1 associated with stripe 120-1 and then read panty data from third storage device 118-3. In the next step of the flush process, cache management module 102 performs an XOR operation or calculation with the old data that was just read from first storage device 118-1 and with the parity data that was just read from third storage device 118-3, and with the new data from cache nodes, resulting in new parity data. In the next step of the flush process, cache management module 102 writes the new data from cache nodes 108 to first storage device 118-1 and writes the new parity data to third storage device 118-3. In this case of a partial stripe write operation, cache management module 102 performs two read operations and two write operations for a total of four storage operations.

On the other hand, to illustrate a full stripe operation, for example, assume that first stripe 120-1 has a size of 256 KB and that cache node list 104 has several cache nodes 108 with a total size of 256 KB with LBA addresses that correspond to the first stripe 120-1. In this case, the size of stripe 120-1 is 256 KB and is the same as the size of the data of the cache nodes 108. The cache management module 102 may execute a flush process and determine whether to write or flush the data from cache nodes 108 to stripe 120-1. The cache management module 102 proceeds with the flush process by first performing an XOR operation or calculation with the new data from cache nodes 108 that will be written to first storage device 118-1 and second storage device 118-2, resulting in new parity data. In the next step of the flush process, cache management module 102 performs a first write operation to write data from the corresponding cache nodes 108 to first storage device 118-1 and a second write operation to write data from the corresponding cache nodes 108 to second storage device 118-2. In the next step of the flush process, the cache management module writes the new parity data to third storage device 118-3. In this case of a full stripe write operation, cache management module 102 performs three write operations and no read operations for a total of three storage operations. As explained above, a full stripe write operation may involve three write operations for a total of three storage operations. In contrast, a partial stripe write operation may involve two read operations and two write operations for a total of four storage operations. Therefore, full stripe write operations may require less disk drive access operations than partial stripe write operations and thus may be more efficient.

The cache management module 102 may be configured to receive and handle sequential and non-sequential data write requests from hosts. As explained above, cache node list 104 may include cache nodes 108 that may be sorted according to LBA order or sequence. The cache management module 102 may determine whether a cache node is sequential or non-sequential by checking for address gaps between the cache nodes. For example, to illustrate, assume that cache node list 104 includes a first cache node 108-1 with an address of LBA 110-1 and third cache node 108-3 with an address of LBA 110-3. In this case, cache management module 102 checks cache node list 104 and determines that there is an address gap between first cache node 108-1 and third cache node 108-3 and therefore marks these cache nodes as non-sequential (non-consecutively addressed) or random cache nodes. On the other hand, for example, assume that cache node list 104 includes a first cache node 108-1 with an address of LBA 110-1 and a second cache node 108-2 with an address of LBA 110-2. In this case, cache management module 102 checks cache node list 104 and determines that there is no gap between first cache node 108-1 and second cache node 108-2 and therefore marks these cache nodes as sequential (consecutively addressed) or continuous cache nodes. In operation, when cache management module 102 receives data from hosts, it generates new cache nodes 108 corresponding to the new host data and determines an insert point in cache node list 104 to insert the new cache node. The cache management module 102 determines whether the new cache node is a sequential cache node or non-sequential cache node in a similar manner as explained above. For example, cache management module 102 checks whether the LBA of the new cache node is adjacent to previous cache nodes up to a predefined boundary such as a stripe boundary and marks cache nodes that are continuous as sequential cache nodes (consecutively addressed). In a similar manner, cache management module 102 checks whether the LBA of the new cache node is adjacent to next cache nodes up to a predefined boundary such as a stripe boundary and marks such cache nodes that are continuous as sequential cache nodes (consecutively addressed).

The cache management module 102 may be configured to check age information of cache nodes 108 to determine whether to flush the cache nodes to storage devices 118 or to retain the cache nodes in cache node list 104. For example, cache management module 102 may check whether the age value of a cache node 108 has expired such as when the age of the cache node is greater than a time-to-live period of the cache node. If cache management module 102 determines that the age of the cache node has expired, then the cache management module flushes or writes the data from cache node to the corresponding locations in storage devices. On the other hand, if cache management module 102 determines that the age of the cache node has not expired, then the cache management module does not flush data from cache node, but rather retains the cache node in the cache node list for the next time that it is checked. As explained above, it may be more efficient to perform full stripe write operations compared to partial stripe write operations. In this case, it may be beneficial to give cache nodes more time to remain in cache node list 104 to increase the likelihood that more cache node 108 are generated and that the cache nodes are sequential or consecutively addressed. In this manner, it increases the possibility for cache nodes 108 to be flushed as a full stripe write operation compared to a partial stripe write operation. In other words, cache management module 102 may be configured to give the cache nodes more time to remain in the cache node list to increase the possibility of adding more sequential cache nodes to the cache node list and group the cache nodes together or coalesce them to allow for full stripe write operations. For example, to illustrate, assume that storage devices 118 are configured with a stripe 120-1 with a size of 256 KB. To further illustrate, assume cache management module 102 receives data from the host that results in three sequential cache nodes with a total of 128 KB of data. In this case, cache management module 102 may decide to not flush the cache nodes because it would result in a partial stripe write operation. Instead, cache management module 102 may provide the cache nodes with more time to remain in the cache node list and to wait for further host data which may result in further sequential cache nodes that may total a full stripe size.

The cache management module 102 may be configured to wait for additional sequential cache nodes which may increase the likelihood of the cache management module performing full stripe write operations which are more efficient than partial stripe write operations. In one example, when cache management module 102 receives a new host request, the cache management module generates a new cache node and checks whether the new cache node is adjacent to previous and adjacent to next cache nodes in the cache node list up to a predefined boundary such as a stripe boundary. If the cache management module 102 determines that there are sequential cache nodes (consecutively addressed) up to the stripe boundary, the cache management module may proceed to flush these sequential cache nodes together to perform a full stripe write operation to corresponding storage devices 118. On the other hand, if cache management module 102 determines that there are gaps between the cache nodes (non-consecutively addressed) up to the stripe boundary, then the cache management module may reset the age of the cache nodes to provide the cache nodes with additional time to provide an opportunity to receive additional data which may result in sequential cache nodes to allow for full stripe write operations.

It should be understood that the above example configuration is for illustrative purposes and that other examples and configurations are possible to practice the techniques of the present application. For example, the functionality of cache management module 102 and cache resources module 104 may be combined into one single module or distributed among different separate functional modules, the functionality of storage controller 100 may be distributed across remote locations or integrated in one device, and the like.

Figure 2:
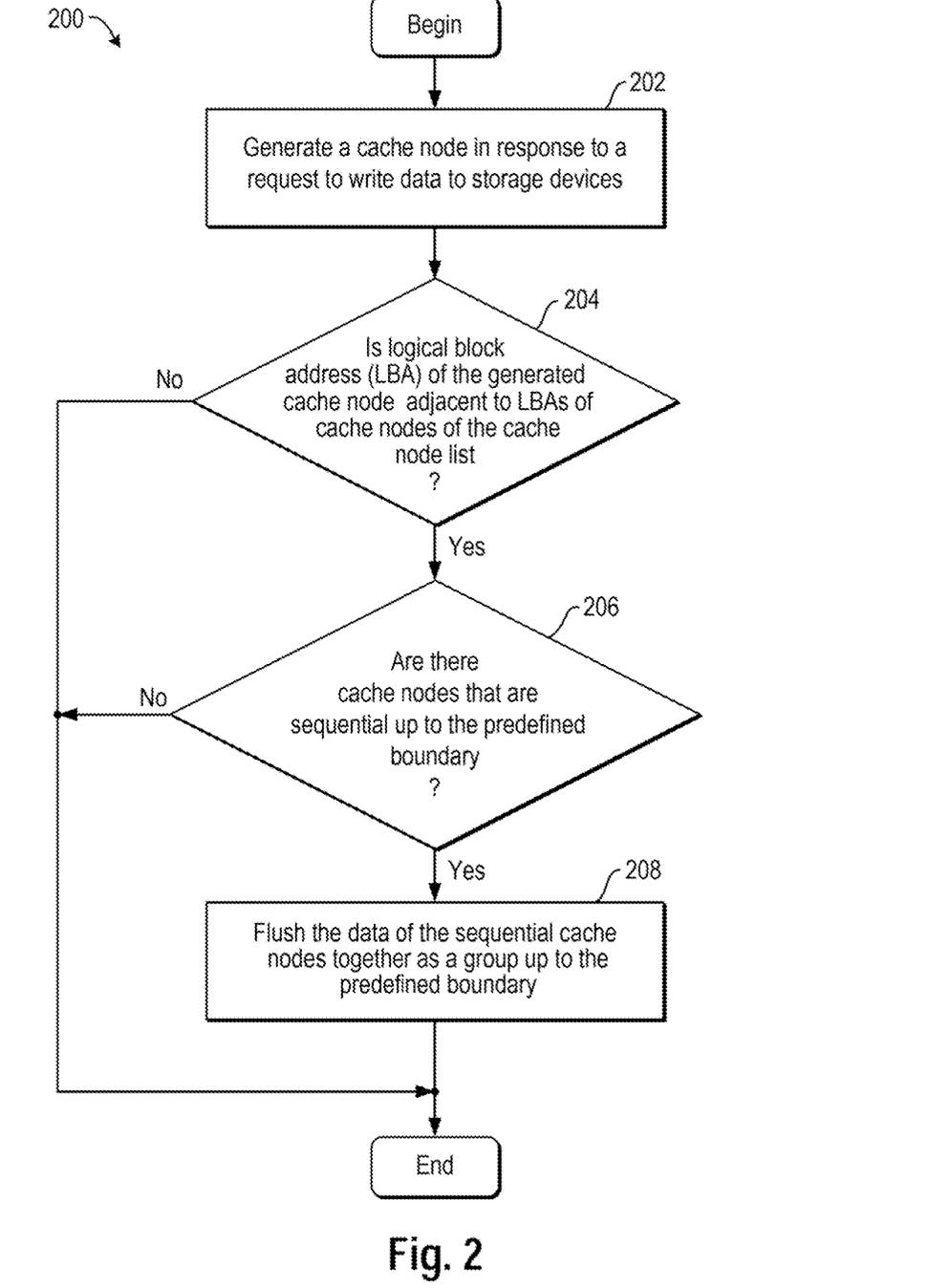
FIG. 2 depicts an example flow chart of a process for cache node processing in accordance with an example of the techniques of the present application.

FIG. 2 depicts an example flow chart of a process for cache node processing in accordance with an example of the techniques of the present application.

In some implementations, such process 200 is conducted by the previously-mentioned storage controller 100. It should be readily apparent that the process depicted in FIG. 2 represent generalized illustrations, and that other processes may be added or existing processes may be removed, modified, or rearranged without departing from the scope and spirit of the present application. In addition, it should be understood that the processes may represent instructions stored on a processor-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with a storage controller. Furthermore, the flow charts are not intended to limit the implementation of the present application, but rather the flow charts illustrate functional information that one skilled in the art could use to design/fabricate circuits, generate software, or use a combination of software and hardware to perform the illustrated processes.

The process 200 may begin at block 202, where cache management module 102 generates a cache node 108 in response to a request to write data to storage devices 118. It may be assumed, to illustrate operation, in one example, that cache management module 102 previously received requests from a host to write data to storage devices 118. In response to the host requests, cache management module 102 generated respective cache nodes 108 to hold the data to be written to the appropriate storage devices 118 and has added the cache nodes to cache node list 104 for subsequent processing. For example, to illustrate, assume that cache node list 104 includes a first cache node 108-1 with an address of LBA 110-1 and a third cache node 108-3 with an address of LBA 110-3. In this case, there is an address gap between these cache nodes such that cache nodes are non-consecutively addressed. In this case, in response to receipt of a new host request, cache management module 102 generates a new cache node to hold the data to be written to the appropriate storage devices 118. The cache management module 102 determines where to insert the new cache node 108 in cache node list 104. For example, assume that cache management module 102 generates a new cache node 108-2 with LBA 110-2 and determines to insert this new cache node in cache node list 104 between first cache node 108-1 and third cache node 108-3 because there is an address gap between LBA 110-1 and LBA 110-3. Once the functions of block 202 are performed, processing proceeds to block 204.

At block 204, cache management module 102 checks whether the LBA of the generated cache node 108 is adjacent to LBAs of cache nodes 108 cache node list 104. Continuing with the above example, if the LBA of the new generated cache node is adjacent to an LBA of cache nodes of the cache node list, then processing proceeds to block 206 for further processing. For example, to illustrate, assume that cache node list 104 includes a first cache node 108-1 with an address of LBA 110-1, new cache node 108-2 with LBA 110-2 and a third cache node 108-3 with an address of LBA 110-3. In this case, cache management module 102 checks cache node list 104 and determines that there is no address gap (consecutively addressed) between first cache node 108-1 second cache node 108-2 and third cache node 108-3. Therefore, processing may proceed to block 206 for further processing. On the other hand, if the LBA of the generated cache node is not adjacent to the LBA of the cache nodes of the cache node list, then processing proceeds to the End block to terminate processing.

At block 206, cache management module 102 checks whether there are cache nodes 108 that are sequential up to a predefined boundary. If there are cache nodes 108 that are sequential up to the predefined boundary, then processing proceeds to block 208 for further processing. For example, storage devices 118 may be configured as storage volumes as part of a RAID storage configuration with stripes 120 extending across the storage devices. In this case, the predefined boundary may be defined as a stripe 120 that extends across the storage devices. The cache management module 102 may determine whether the number of cache nodes 108 of cache node list 104 is equal to the total size of the cache nodes total a size of a stripe boundary 120. If they are equal, then processing proceeds to block 208 for further processing of cache nodes 108. Continuing with the example, to illustrate, assume that cache node list 104 includes a first cache node 108-1 with an address of LBA 110-1, new cache node 108-2 with address LBA 110-2 and a third cache node 108-3 with address of LBA 110-3. In this case, cache management module 102 checks cache node list 104 and determines that there are no gaps (consecutively addressed) between first cache node 108-1, new cache node 108-2 and third cache node 108-3, hence sequential cache nodes. It can be further assumed that these cache nodes 108 have respective LBA that correspond to stripe boundary 120. Therefore, cache management module 102 determines that these cache nodes 108 are sequential up to the stripe boundary. In this case processing proceeds to block 208 for further processing. On the other hand, if the cache nodes 108 are not sequential cache nodes up to the predefined boundary, then processing proceeds to the End block to terminate processing.

At block 208, cache management module 102 flushes the data of the sequential cache nodes 108 together as a group up to the predefined boundary. Continuing with the above example, the predefined boundary may be defined as a stripe 120 boundary that extends across the storage devices. The cache management module 102 determines that the number of cache nodes 108 of cache node list 104 and the size of the cache nodes total or reach a stripe boundary 120. In this case, cache management module 102 flushes the data of the sequential cache nodes together as a group up to the predefined boundary. For example, cache management module 102 writes the data from cache nodes 108 to storage device 118 up to the appropriate stripe boundary. In other words, as explained above, cache management module 102 flushes the data as a full stripe write operation which may be more efficient than a partial stripe write operation.

It should be understood that the above examples are for illustrative purposes and that other examples and configurations are possible to practice the techniques of the present application.

Figure 3A:
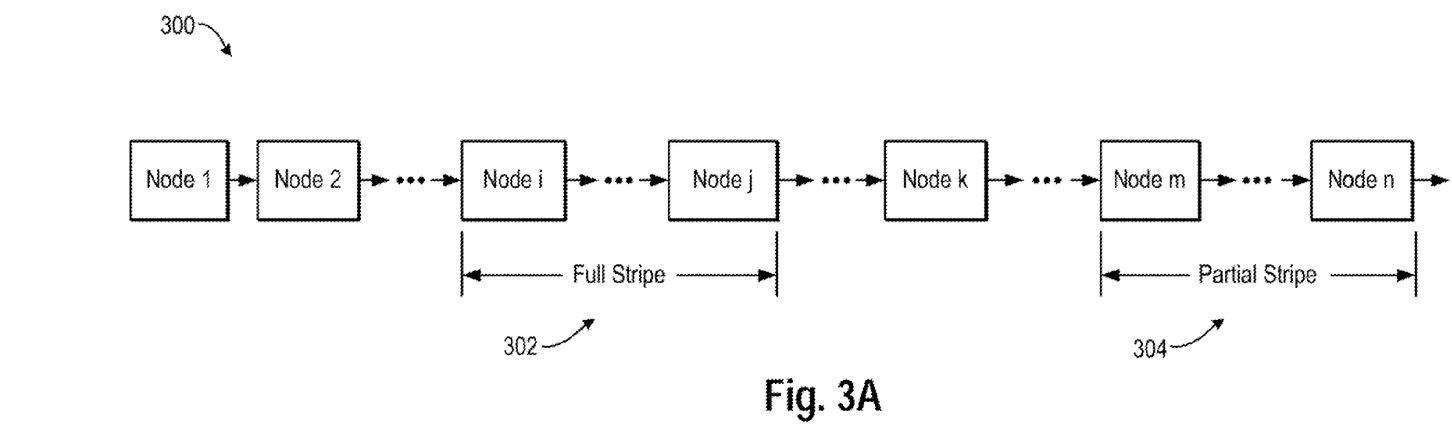
FIGS. 3A through 3B depict example diagrams of cache node processing in accordance with an example of the techniques of the present application.
Figure 3B:
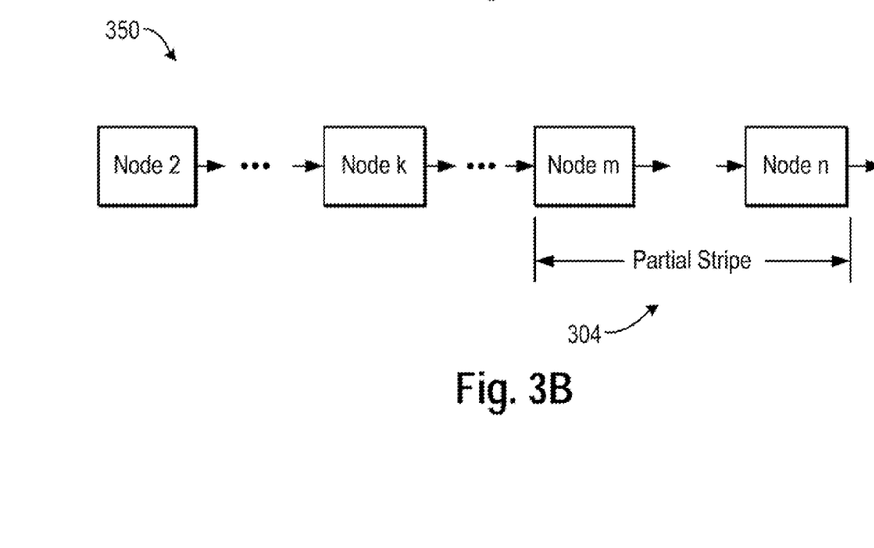

FIGS. 3A through 3B depict example diagrams of cache node processing in accordance with an example of the techniques of the present application.

FIG. 3A depicts an example diagram of cache node processing in accordance with an example of the techniques of the present application. For example, to illustrate, FIG. 3A is a diagram 300 showing a cache node list with cache nodes. The cache management module 102 determines that cache nodes labeled Node 1, Node 2, Node k are non-sequential cache nodes (non-consecutively addressed) or random cache nodes because there are gaps between the addresses of these cache nodes. Furthermore, cache management module 102 determines that cache nodes labeled Node i through Node j are sequential cache nodes (consecutively addressed) up to a stripe boundary because there are no gaps between the addresses of these cache nodes and these cache nodes make up a full stripe as shown by arrow 302. On the other hand, cache management module 102 determines that cache nodes labeled Node m through Node n are sequential cache nodes that make up a partial stripe, as shown by arrow 304, because they require more cache nodes to make up a full stripe.

FIG. 3B depicts an example diagram of cache node processing in accordance with an example of the techniques of the present application. Continuing with the example shown in FIG. 3A, to illustrate operation. FIG. 3B provides a diagram 350 showing cache node list after the cache nodes shown in FIG. 3A have been flushed by cache management module 102. The cache management module 102 determines that cache nodes labeled Node i through Node j are sequential cache nodes (consecutively addressed) up to a stripe boundary and proceeds to flush the data of the cache nodes to the appropriate storage devices and thus are not shown in FIG. 3B. On the other hand, cache management module 102 determines that cache nodes labeled Node m through Node n are sequential cache nodes but these cache nodes do not make up a full stripe and the age of these cache nodes has not expired, as shown by arrow 304. In this case, cache management module 102 resets access time 112 of these cache nodes to allow them to remain in the cache node list for possible further cache nodes to make up a full stripe at a later time. Furthermore, cache management module 102 determines that age of the non-sequential cache node labeled Node 1 has expired and proceeds to flush the data of this cache node to the appropriate storage devices. On the other hand, cache management module 102 determines that the age of non-sequential cache nodes labeled Node 2 and Node k has not expired and so resets access time 112 of these cache nodes to retain them in the cache node list for possible future cache nodes. With respect to Node m through Node n that make up particular stripe, shown by arrow 304, if cache management module 102 determines that no further cache nodes are received to make up a full stripe and the age of the cache nodes has expired, then the cache management module may proceed to flush the data of these cache nodes as a partial stripe operation to the appropriate storage devices. In other words, cache management module 102 resets the access time 112 of sequential cache nodes to increase the likelihood that further sequential cache nodes may be generated which may be combined to perform a full stripe operation. However, if after a certain period of time the cache nodes do not form a full stripe, then cache management module 102 proceeds to flush the data of the cache nodes as part of a partial stripe write operation.

It should be understood that the above example configuration is for illustrative purposes and that other examples and configurations are possible to practice the techniques of the present application.

Figure 4:
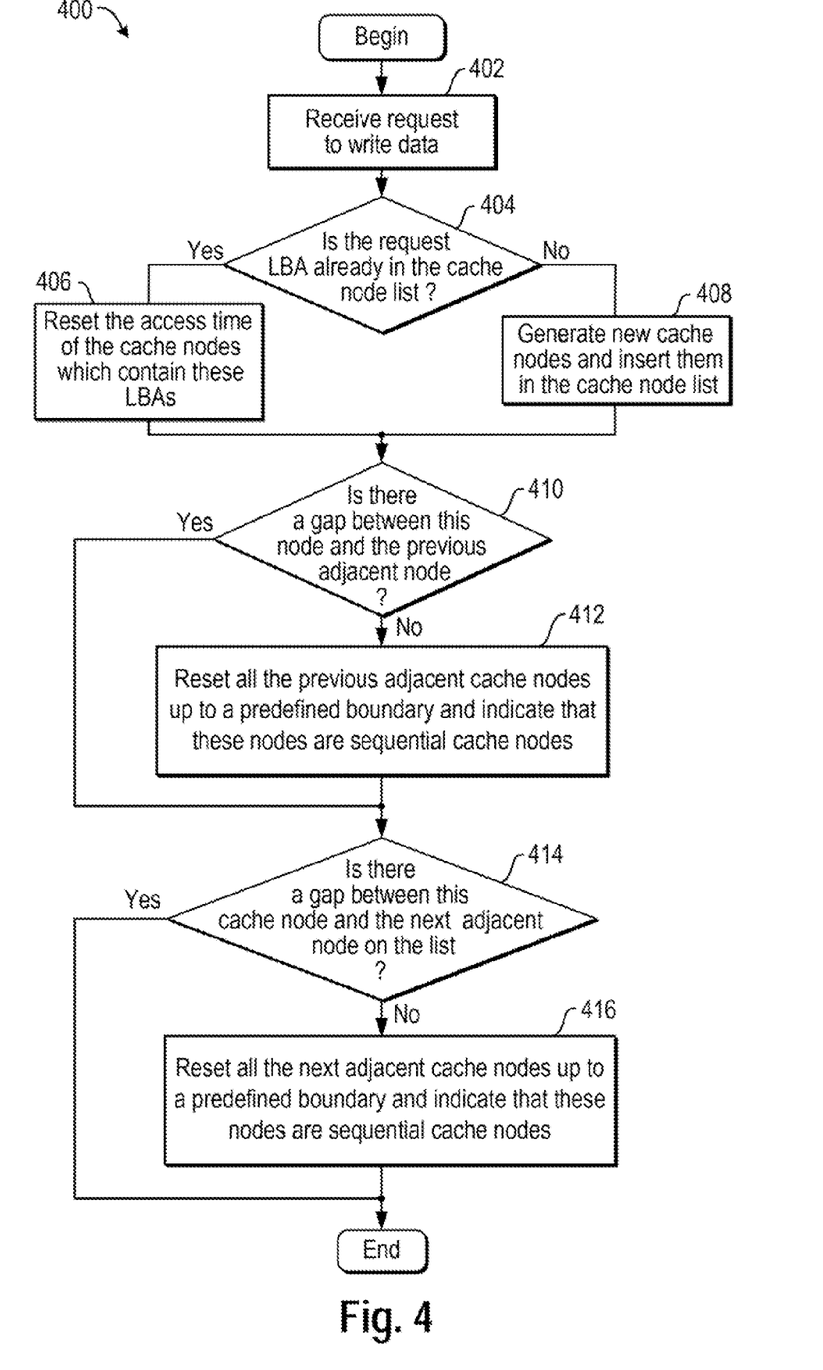
FIG. 4 depicts example flow chart of a process of cache node processing in accordance with an example of the techniques of the present application.

FIG. 4 depicts an example flow chart of a process 400 of cache node processing in accordance with an example of the techniques of the present application. In one example, process 400 may implement some of the functionality of the host command process to handle host commands to request to write data to storage, as described above.

In some implementations, such process 400 is conducted by the previously-mentioned storage controller 100. It should be readily apparent that the process depicted in FIG. 4 represent generalized illustrations, and that other processes may be added or existing processes may be removed, modified, or rearranged without departing from the scope and spirit of the present application. In addition, it should be understood that the processes may represent instructions stored on a processor-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with a storage controller. Furthermore, the flow charts are not intended to limit the implementation of the present application, but rather the flow charts illustrate functional information that one skilled in the art could use to design/fabricate circuits, generate software, or use a combination of hardware and software to perform the illustrated processes.

The process 400 may begin at block 402, where cache management module 102 receives requests to write data. In one example, to illustrate, cache management module 102 generates a cache node in response to a request from a host to write data to storage devices. The cache management module 102 may have previously received requests from a host to write data to storage devices 118. In response to the host requests, cache management module 102 generated respective cache nodes 108 to hold the data to be written to the appropriate storage devices 118 and has added the cache nodes to cache node list 104 for subsequent processing. For example, to illustrate, assume that cache node list 104 includes a first cache node 108-1 with an address of LBA 110-1 and a third cache node 108-3 with an address of LBA 110-3. Once the functions of block 402 are performed, processing proceeds to block 404.

At block 404, cache management module 102 checks whether the LBA of the request is present in cache node 108 of cache node list 104. If the LBA of the request is not present in the cache node of the cache node list, then processing proceeds to block 408. For example, to illustrate, it can be assumed that in response to receipt of a new host request to write data, cache management module 102 generates a new cache node to hold the data to be written to the appropriate storage devices 118. For example, assume that cache management module 102 generates a new cache node 108-2 with LBA 110-2. In this case, cache management module 102 determines that this cache node 108-2 has LBA 110-2 that is not in cache node list 104, which already has first cache node 108-1 and third cache node 108-3, as described above. In this case, processing proceeds to block 408 to insert this new cache node 108-2 in cache node list 104 between first cache node 108-1 and third cache node 108-3.

On the other hand, if the LBA of the host request is present in cache node 108 of cache node list 104, then processing proceeds to block 408. For example, to illustrate, it can be assumed that in response to receipt of a new host request, cache management module 102 generates a new cache node 108-1 with LBA 110-1. In this case, cache management module 102 determines that this cache node 108-1 has a LBA 110-1 which is already present in cache node list 104. In this case, processing proceeds to block 406.

At block 406, cache management module 102 resets access time 112 of cache nodes 108 which contain the LBAs. For example, to illustrate, it can be assumed that in response to receipt of a new host request, cache management module 102 generates a new cache node 108-1 with LBA 110-1. In this case, cache management module 102 determines that this cache node 108-1 with LBA 110-1 is already in cache node list 104. In this case, cache management module 102 resets access time 112-1 of cache node 108-1. Once the functions of block 406 have been performed, processing proceeds to block 410.

At block 408, cache management module 102 generates new cache nodes 108 and inserts them into cache node list 104. For example, to illustrate, it can be assumed that cache management module 102 generates a new cache node 108-2 with LBA 110-2. In this case, cache management module 102 determines that this cache node 108-2 with LBA 110-2 is not in cache node list 104, which already has first cache node 108-1 and third cache node 108-3, as described above. In this case, cache management module 102 inserts this new cache node 108-2 in cache node list 104 between first cache node 108-1 and third cache node 108-3. Once the functions of block 408 have been performed, processing proceeds to block 410.

At block 410, cache management module 102 checks whether there is a gap between this cache node and the previous adjacent cache node. If there is an address gap between this cache node and the previous cache node, then processing proceeds to block 414. For example, to illustrate, it can be assumed that cache management module 102 generates a new cache node 108-5 with LBA 110-5. In this case, cache management module 102 determines that this cache node 108-5 with LBA 110-5 is not adjacent (not consecutively addressed) to a previous cache node in cache node list 104. In this case, since there is an address gap between cache node 108-5 and cache node 108-3, processing proceeds to block 414.

On the other hand, if there is no gap between this cache node and the previous cache node, then processing proceeds to block 412. For example, to illustrate, it can be assumed that cache management module 102 generates a new cache node 108-2 with LBA 110-2. In this case, cache management module 102 determines that this cache node 108-2 with LBA 110-2 is adjacent (consecutively addressed) to a previous cache node of cache node list 104. In this case, there is no address gap between cache node 108-2 and cache node 108-3 and processing proceeds to block 412.

At block 412, cache management module 102 resets access time of all the previous adjacent cache nodes up to a predefined boundary and indicates that these nodes are sequential cache nodes. For example, to illustrate, it can be assumed that cache management module 102 generates a new cache node 108-2 that is adjacent to previous cache node 108-1 (consecutively addressed). It can be further assumed that these cache nodes 108 correspond to a stripe 120 of storage devices 118. In this case, cache management module 102 resets access time 112 of all the previous adjacent cache nodes including cache node 108-1 and current cache node 108-2 up to stripe boundary 120 and indicates that these cache nodes are sequential cache nodes (consecutively addressed). Once the functions of block 412 have been performed, processing proceeds to block 414.

At block 414, cache management module 102 checks whether there is a gap between this cache node and the next adjacent cache node. If there is no address gap (consecutively addressed) between this cache node and the next adjacent cache node, then processing proceeds to block 416. For example, to illustrate, it can be assumed that cache management module 102 generates a new cache node 108-2 that is adjacent to next cache node 108-3. It can be further assumed that these cache nodes 108 correspond to a stripe 120 of storage devices 118. In this case, since there is no address gap (consecutively addressed) between this cache node 108-2 and the next adjacent cache node 108-3, processing proceeds to block 416. On the other hand, if there is an address gap (not consecutively addressed) between this cache node and the next adjacent cache node, then processing proceeds to the End block to terminate processing. For example, to illustrate, it can be assumed that cache management module 102 generates a new cache node 108-4 and that there is no adjacent next cache node. In this case, processing proceeds to the End black to terminate processing.

At block 416, cache management module 102 resets the access time of the next adjacent cache node and sets a flag in the cache node to indicate that these nodes are sequential cache nodes. For example, to illustrate, it can be assumed that cache management module 102 generates a new cache node 108-2 that is adjacent to next cache node 108-3 (consecutively addressed) and that these cache nodes 108 correspond to a stripe 120 of storage devices 118. In this case, cache management module 102 resets access time 112 of all the next adjacent cache nodes including cache node 108-3 and current cache node 108-2 up to stripe boundary 120 and indicates that these nodes are sequential cache nodes (consecutively addressed). Once the functions of block 416 have been performed, processing proceeds to the End block to terminate processing.

It should be understood that the above example configuration is for illustrative purposes and that other examples and configurations are possible to practice the techniques of the present application.

Figure 5:
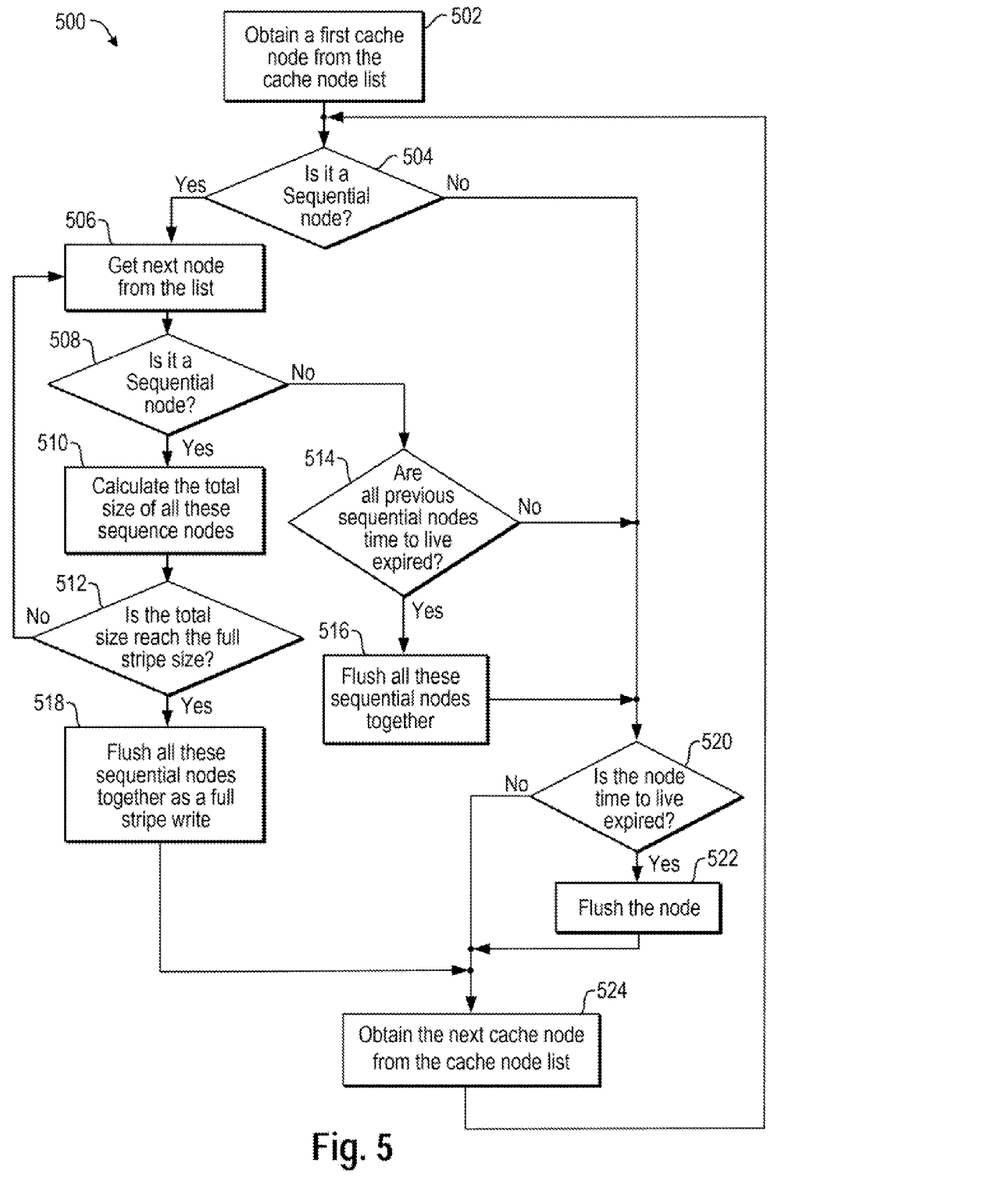
FIG. 5 depicts another example flow chart of a process of cache node processing in accordance with an example of the techniques of the present application.

FIG. 5 depicts an example flow chart of a process 500 of cache node processing in accordance with an example of the techniques of the present application. In one example, process 500 may implement some of the functionality of the flush process to determine whether to flush data from the cache nodes or to retain the cache nodes in cache node list, as described above.

In some implementations, such process 500 is conducted by the previously-mentioned storage controller 100. It should be readily apparent that the process depicted in FIG. 5 represent generalized illustrations, and that other processes may be added or existing processes may be removed, modified, or rearranged without departing from the scope and spirit of the present application. In addition, it should be understood that the processes may represent instructions stored on a processor-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with a storage controller. Furthermore, the flow charts are not intended to limit the implementation of the present application, but rather the flaw charts illustrate functional information that one skilled in the art could use to design/fabricate circuits, generate software, or use a combination of hardware and software to perform the illustrated processes.

The process 500 may begin at block 502, where cache management module 102 obtains a first cache node 108 from cache node list 104. In one example, to illustrate, cache management module 102 may have previously received requests from a host to write data to storage devices 118. In response to the host requests, cache management module 102 generated respective cache nodes 108 to hold the data. For example, to illustrate, assume that cache node list 104 includes a first cache node 108-1 with an address of LBA 110-1, second cache node 108-2 with an address of LBA 110-2 and a third cache node 108-3 with an address of LBA 110-3, all of which are consecutively addressed or in sequential LBA order. The cache management module 102 proceeds to select cache nodes in LBA order, and in this case, it can be assumed that cache management module 102 selects first cache node 108-1 from cache node list 104. Once the functions of block 502 have been performed, processing proceeds to block 504.

At block 504, cache management module 102 checks whether this first cache node 108 is a sequential cache node. If the first cache node is a sequential cache node, then processing proceeds to block 506 for further processing. To illustrate, for example, it can be assumed that first cache node 108-1 is the current cache node and that it is a sequential cache node. In this case, processing therefore proceeds to block 506 for further processing. On the other hand, if the first cache node is a not a sequential cache node, then processing proceeds to block 520 for further processing. To illustrate, for example, it can be assumed that third cache node 108-3 is the current cache node and that it is not a sequential cache node. In this case, processing therefore proceeds to block 520 for further processing.

At block 506, cache management module 102 obtains the next cache node 108 from cache node list 104. Continuing with the above example, it can be assumed that first cache node 108-1 is a sequential cache node. The cache management module 102 may then proceed to select the next cache node from cache node list 104 which is second cache node 108-2. Once the functions of block 506 have been performed, processing proceeds to block 508.

At block 508, cache management module 102 checks whether the next obtained cache node 108 from cache node list 104 is a sequential cache node. If the next obtained cache node from cache node list 104 is a sequential cache node, then processing proceeds to block 510. Continuing with the above example, it can be assumed that first cache node 108-1 is a sequential cache node and that second cache node 108-2, which is the currently selected cache node, is also a sequential cache node. In this case, processing proceeds to block 510 for further processing. On the other hand, if the next obtained cache node from the cache node list is not a sequential cache node, then processing proceeds to block 514.

At block 510, cache management module 102 calculates the total size of these sequential cache nodes 108. Continuing with the above example, it can be assumed that first cache node 108-1 and second cache node 108-2 are sequential cache nodes (consecutively addressed). It can be further assumed that first cache node 108-1 has a first data size 114-1 of 128 KB and that second cache node 108-2 has a second data size 114-2 of 128 KB. Furthermore, it can be assumed that first cache node 108-1 and second cache node 108-2 correspond to stripe 120-1 which also has a size of 256 KB. In this case, the total size of the cache nodes is 256 KB which is the same as the size of stripe 120-1. Once the functions of block 510 have been performed, processing proceeds to block 512 for further processing.

At block 512, cache management module 102 checks whether the total size reaches the full stripe size of a stripe 120. If the total size reaches the full stripe size of a stripe 120, then processing proceeds to block 518 for further processing. Continuing with the above example, it can be assumed that stripe 120-1 has a size of 256 KB and that the total size of the corresponding cache nodes is also 256 KB. In this case, the total size of the cache nodes reaches the full stripe size of a stripe and processing proceeds to block 518 for further processing. On the other hand, if the total size does not reach the full stripe size of a stripe, then processing proceeds back to block 506 to obtain the next cache node from the cache node list. For example, stripe 120-1 has a size of 512 KB and the total size of the corresponding cache nodes is 256 KB. In this case, the total size of cache nodes does not reach the full stripe size of a stripe and processing proceeds back to block 506 to obtain the next cache node 108 from cache node list 104.

At block 514, cache management module 102 checks whether all of the previous sequential cache nodes 108 time-to-live have expired. If all of the previous sequential cache nodes time-to-live have expired, then processing proceeds to block 516 for further processing. For example, to illustrate, it can be assumed that first cache node 108-1 and second cache node 108-2 are sequential cache nodes, that is, the cache nodes are consecutively addressed. It can be further assumed that the time-to-live of first cache node 108-1 and second cache node 108-2 have expired. In this case, processing proceeds to block 516 for further processing. On the other hand, if all of the previous sequential cache nodes time-to-live have not expired, then processing proceeds to block 520 for further processing.

At block 516, cache management module 102 flushes all of these sequential cache nodes 108 together as a group. Continuing with the above example, to illustrate, it can be assumed that first cache node 108-1 and second cache node 108-2 are sequential cache nodes and that the time-to-live of these cache nodes have expired. In this case, cache management module 102 flushes all of these sequential cache nodes together as a group to corresponding stripe 120-1. This flush operation is a partial stripe write operation which may not be as efficient as a full stripe write operation. Once the functions of block 516 have been performed, processing proceeds to block 520 for further processing.

At block 518, cache management module 102 flushes all of these sequential cache nodes 108 together as a full stripe. Continuing with the above example, it can be assumed that first cache node 108-1 and second cache node 108-2 correspond to stripe 120-1. In this case, cache management module 102 proceeds to flush the data of first cache node 108-1 and second cache node 108-2 to corresponding stripe 120-1. This flush operation is a full stripe write operation which may be more efficient and provide better performance than partial stripe write operation. Once the functions of block 518 have been performed, processing proceeds to block 524.

At block 520, cache management module 102 checks whether this particular cache node 108 time-to-live has expired. If this particular cache node time-to-live has expired, then processing proceeds to block 522 for further processing. For example, to illustrate operation, it can be assumed that first cache node 108-1 is not a sequential cache node and that the time-to-live of this cache node has expired. In this case, processing proceeds to block 522 for further processing. On the other hand, if this particular cache node time-to-live has not expired, then processing proceeds to block 524 for further processing.

At block 522, cache management module 102 flushes the cache node 108. For example, to illustrate operation, it can be assumed that first cache node 108-1 is not a sequential cache node and that the time-to-live of this cache node has expired. In this case, cache management module 102 flushes cache node 108-1 to corresponding stripe 120-1. This flush operation is a partial stripe write operation which may not be as efficient as a full stripe write operation. Once the functions of block 522 have been performed, the processing proceeds to block 524

At block 524, cache management module 102 obtains the next cache node 108 from cache node list 104. Continuing with the above example, it can be assumed cache management module 102 already selected and processed first cache node 108-1 and second cache node 108-2 and therefore the next cache node selected is cache node 108-3 from cache node list 104. Once the functions of block 524 have been performed, then processing proceeds back to block 504.

It should be understood that the above examples are for illustrative purposes and that other examples and configurations are possible to practice the techniques of the present application.

Figure 6:
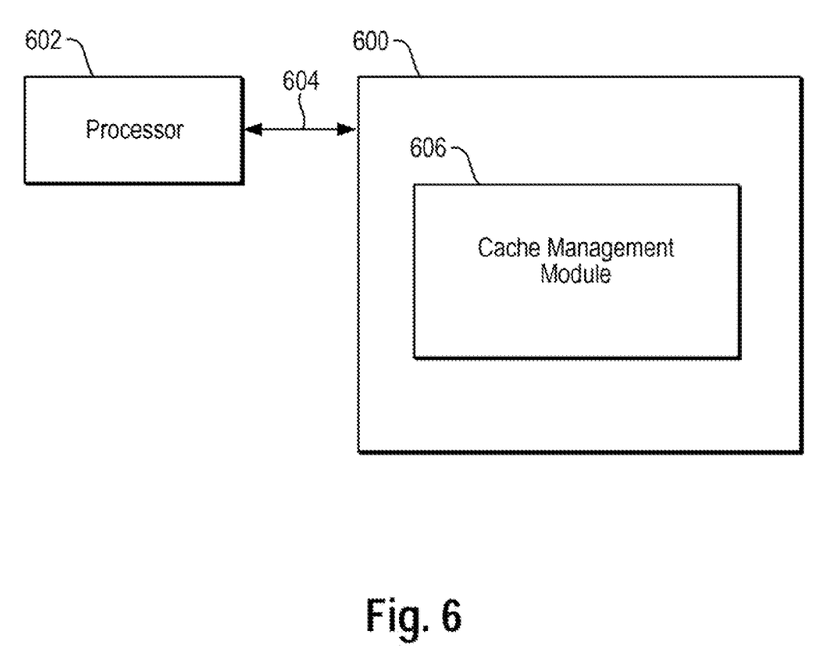
FIG. 6 depicts an example block diagram showing a non-transitory, computer-readable medium that stores instructions for cache node processing in accordance with an example of the techniques of the present application.

FIG. 6 is an example block diagram showing a non-transitory, computer-readable medium that stores code for operating a device. The non-transitory, computer-readable medium is generally referred to by the reference number 600 and may be included in storage controller 100 described in relation to FIG. 1. The non-transitory, computer-readable medium 600 may correspond to any typical storage device that stores computer-implemented instructions, such as programming code or the like. For example, the non-transitory, computer-readable medium 600 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

A processor 602 generally retrieves and executes the instructions stored in the non-transitory, computer-readable medium 600 to operate a storage controller in accordance with an example. In an example, the tangible, machine-readable medium 500 may be accessed by the processor 602 over a bus 604. A first region 606 of the non-transitory, computer-readable medium 600 may include cache management module functionality as described herein.

Although shown as contiguous blocks, the software components may be stored in any order or configuration. For example, if the non-transitory, computer-readable medium 600 is a hard drive, the software components may be stored in non-contiguous, or even overlapping, sectors.

The foregoing may describe a novel and previously unforeseen approach to distribute write cache resources among all the storage volumes such that higher utilization storage volumes may be allocated more write cache resources than lower utilization storage volumes. While the above application has been shown and described with reference to the foregoing examples, it should be understood that other forms, details, and implementations may be made without departing from the spirit and scope of the application that is defined in the following claims.

What is claimed is:

1. A storage controller for cache node processing, comprising:
   a cache node list; and
   a cache management module to:
      generate a cache node in response to a request to write data to storage devices;
      in response to a logical block address (LBA) of the cache node that is generated being adjacent to the LBA of cache nodes of the cache node list, check if a total size of cache nodes that are in a consecutively addressed sequential order has reached a predefined boundary, wherein the predefined boundary includes a full stripe of storage configured as a redundant array of independent disk (RAID); and
      in response to the total size of the cache nodes that are in the consecutively addressed sequential order having reached the predefined boundary, flush the data of the cache nodes that are sequential together as a group up to the predefined boundary.

2. The storage controller of claim 1, wherein the cache management module is further configured to determine an insert point to insert the cache node that is generated into the cache node list and then to insert the cache node that is generated into the cache node list at the insert point.

3. The storage controller of claim 1, wherein the cache management module is further configured to configure the cache nodes of the cache node list to include pointers to memory configured as write cache to hold the data which is to be written to the storage devices.

4. The storage controller of claim 1, wherein the cache management module is further configured to sort the cache nodes of the cache node list in accordance with an order of the LBA.

5. The storage controller of claim 1, wherein the cache management module is further configured to:
when an age of the cache node of the cache node list is greater than a time-to-live of the cache node, then flush the data of the cache node to the storage devices.

6. The storage controller of claim 1, wherein the cache management module is further configured to:
when the LBA of the cache node that is generated and an LBA of previous adjacent cache nodes are sequential, then reset an access time of the cache node that is generated and all previous adjacent cache nodes up to the predefined boundary and indicate that the cache node that is generated and the all previous adjacent cache nodes are sequential cache nodes; and
when the LBA of the cache node that is generated and the LBA of next adjacent cache nodes are sequential, then reset the access time of the cache node that is generated and all next adjacent cache nodes up to the predefined boundary and indicate that the cache node that is generated and the all next adjacent cache nodes are sequential cache nodes.

7. A method for cache node processing, comprising:
generating a cache node in response to a request to write data to storage devices;
in response to a logical block address (LBA) of the cache node that is generated being adjacent to the LBA of cache nodes of a cache node list, checking if a total size of cache nodes that are in a consecutively addressed sequential order has reached a predefined boundary, wherein the predefined boundary includes a full stripe of storage configured as a redundant array of independent disk (RAID); and
in response to the total size of the cache nodes that are in the consecutively addressed sequential order having reached the predefined boundary, flushing the data of the cache nodes that are sequential together as a group up to the predefined boundary.

8. The method of claim 7, further comprising determining an insert point to insert the cache node that is generated into the cache node list and then inserting the cache node that is generated into the cache node list at the insert point.

9. The method of claim 7, further comprising configuring the cache nodes of the cache node list to include pointers to memory configured as a write cache to hold the data which is to be written to the storage devices.

10. The method of claim 7, further comprising sorting the cache nodes of the cache node list in accordance with an order of the LBA.

11. The method of claim 7, wherein if an age of a cache node of the cache node list is greater than a time-to-live of the cache node, then flushing the data of the cache node to the storage devices.

12. The method of claim 7, wherein:
when the LBA of the cache node that is generated and LBA of previous adjacent cache nodes are sequential, then resetting an access time of the cache node that is generated and all previous adjacent cache nodes up to the predefined boundary and indicating that the cache node that is generated and the all previous adjacent cache nodes are sequential cache nodes; and
when the LBA of the cache node that is generated and the LBA of next adjacent cache nodes are sequential, then resetting the access time of the cache node that is generated and all next adjacent cache nodes up to the predefined boundary and indicating that the cache node that is generated and the all next adjacent cache nodes are sequential cache nodes.

13. A non-transitory computer-readable medium having computer executable instructions stored thereon for cache node processing, the instructions are executable by a processor to:
generate a cache node in response to a request to write data to storage devices;
in response to a logical block address (LBA) of the cache node that is generated being adjacent to the LBA of cache nodes of a cache node list, check if a total size of cache nodes that are in a consecutively addressed sequential order has reached a predefined boundary, wherein the predefined boundary includes a full stripe of storage configured as a redundant array of independent disk (RAID); and
in response to the total size of the cache nodes that are in the consecutively addressed sequential order having reached the predefined boundary, flush data of the cache nodes that are sequential together as a group up to the predefined boundary.

14. The non-transitory computer-readable medium of claim 13, further comprising instructions that if executed cause the processor to: determine an insert point to insert the cache node that is generated into the cache node list and then inserting the cache node that is generated into the cache node list at the insert point.

15. The non-transitory computer-readable medium of claim 13 further comprising instructions that if executed cause the processor to: configure the cache nodes of the cache node list to include pointers to memory configured as a write cache to hold the data which is to be written to the storage devices.

16. The non-transitory computer-readable medium of claim 13 further comprising instructions that if executed cause the processor to: sort the cache nodes of the cache node list in accordance with an order of the LBA.

17. The non-transitory computer-readable medium of claim 13 further comprising instructions that if executed cause the processor to:
when an age of a cache node of the cache node list is greater than a time-to-live of the cache node, flush the data of the cache node to the storage devices.

18. The non-transitory computer-readable medium of claim 13 further comprising instructions that if executed cause the processor to:
when the LBA of the cache node that is generated and LBA of previous adjacent cache nodes are sequential, then resetting an access time of the cache node that is generated and all previous adjacent cache nodes up to the predefined boundary and indicating that the cache node that is generated and the all previous adjacent cache nodes are sequential cache nodes; and when the LBA of the cache node that is generated and the LBA of next adjacent cache nodes are sequential, then resetting the access time of the cache node that is generated and all next adjacent cache nodes up to the predefined boundary and indicating that the cache node that is generated and the all next adjacent cache nodes are sequential cache nodes.

* * * * *